United States Patent [19]
Utsuno et al.

[11] Patent Number: 5,845,825
[45] Date of Patent: Dec. 8, 1998

[54] TIRE-FIXING DEVICE

[75] Inventors: Ryuji Utsuno, Kani; Yoshihiro Murase, Gifu, both of Japan

[73] Assignee: Aoyama Seisakusho Co., Ltd., Nagoya, Japan

[21] Appl. No.: 911,766

[22] Filed: Aug. 15, 1997

[30] Foreign Application Priority Data

Sep. 11, 1996 [JP] Japan ..................................... 8-240631

[51] Int. Cl.⁶ .................................................. B62D 43/00
[52] U.S. Cl. ..................................... 224/42.24; 224/42.12; 411/533
[58] Field of Search ............................. 224/42.24, 42.12, 224/42.13, 42.14, 42.26, 42.21; 248/354.3, 289.11, 316.1, 316.4, 316.6; 269/244; 411/533, 368, 369, 370, 545

[56] References Cited

U.S. PATENT DOCUMENTS

| 1,257,666 | 2/1918 | Barnes | 224/42.24 |
| 4,621,961 | 11/1986 | Gullistan | 411/533 |

FOREIGN PATENT DOCUMENTS

| 1229635 | 9/1960 | France | 224/42.24 |
| 4037255 A | 5/1992 | Germany | 224/42.12 |
| 136575 | 8/1983 | Japan | 224/42.21 |
| 60-9114 | 4/1985 | Japan . | |
| 61-201982 | 12/1986 | Japan . | |
| 39376 | 2/1987 | Japan | 224/42.12 |
| 2-32553 | 9/1990 | Japan . | |

*Primary Examiner*—Allan N. Shoap
*Assistant Examiner*—Gregory M. Vidovich
*Attorney, Agent, or Firm*—Frishauf, Holtz, Goodman, Langer & Chick

[57] ABSTRACT

A spare tire-fixing device comprises a rod-shaped clamping member (1) having a screw (2) at the lower end thereof and a head (3) at the upper end thereof, respectively; and a substantially disc-shaped tire presser (10) having a shaft tube (11) having first and second circular bearing seats (11a, 11b) as both end faces thereof and a center hole into which the screw of the clamping member can be inserted, at the center thereof, and a collar (12) which is a doughnut-shaped member linked with the shaft tube via a peripheral frame (13) in the outer peripheral direction of the shaft tube and has first and second tire-pressing faces (12a, 12b) as both end faces thereof, respectively, wherein a difference in level corresponding to the difference between the width of a normal tire and that of a temporary tire is provided between the shaft tube and the collar.

4 Claims, 4 Drawing Sheets

TIRE-FIXING DEVICE

BACKGROUND OF THE INVENTION

This invention relates to a tire-fixing device to be used for housing a spare tire or a normal tire in a spare tire house provided at the bottom of a trunk room of a vehicle.

Japanese Utility Model Publication No. 9114/1985, the disclosure of which is herein incorporated by reference, discloses a spare tire house structure, which forms the arrangement of the spare tire house in the trunk room for this application.

In the prior art, as a tire-fixing device, there has been used a tire-fixing device comprising a clamping member in which a head for screwing operation is provided at the upper end of a shaft having a screw formed at the lower end thereof; and a cup-shaped spare tire presser in which a collar for pressing a tire is extended from the upper end edge thereof, as described as a prior art technique of Japanese Utility Model Publication No. 32553/1990. When the above tire-fixing device is used for an automobile using, as a spare tire, a temporary tire having a tire width narrower than that of a normal tire in recent years, two kinds of clamping members having different lengths for a spare tire and a normal tire are required, which is inconvenient in use and also disadvantageous in the point of cost.

SUMMARY OF THE INVENTION

An object of the present invention is to provide a spare tire-fixing device which can solve the above problems in the prior art, specifically to provide a spare tire-fixing device in which not only a temporary tire but also a normal tire can be precisely and easily housed and fixed stably in a spare tire house by a tire presser and one clamping member, which is convenient in use and advantageous in the point of cost.

The present invention is a spare tire-fixing device which comprises:

a rod-shaped clamping member (1) having a screw (2) at the lower end thereof and a head (3) at the upper end thereof, respectively; and a substantially disc-shaped tire presser (10) having a shaft tube (11) having first and second circular bearing seats (11h*a*) and (11*b*) as both end faces thereof and a center hole into which the screw of said clamping member can be inserted, at the center thereof, and a collar (12) which is a doughnut-shaped member linked with said shaft tube via a peripheral frame (13) in the outer peripheral direction of said shaft tube and has first and second tire-pressing faces (12*a*) and (12*b*) as both end faces thereof, respectively, wherein at the lower face of a bearing plate (5) of the head of said clamping member, an engagement member (7) is perpendicularly provided, which holds said clamping member so that when the screw of said clamping member is inserted into the center hole of the shaft tube of said tire presser, said clamping member is allowed to rotate relative to the longitudinal axis of said clamping member, but is controlled not to move in the direction of said longitudinal axis; and difference in level corresponding to the difference between the width of a normal tire and that of a temporary tire is provided between said shaft tube and said collar.

DESCRIPTION OF THE PREFERRED EMBODIMENTS

Figure 1:
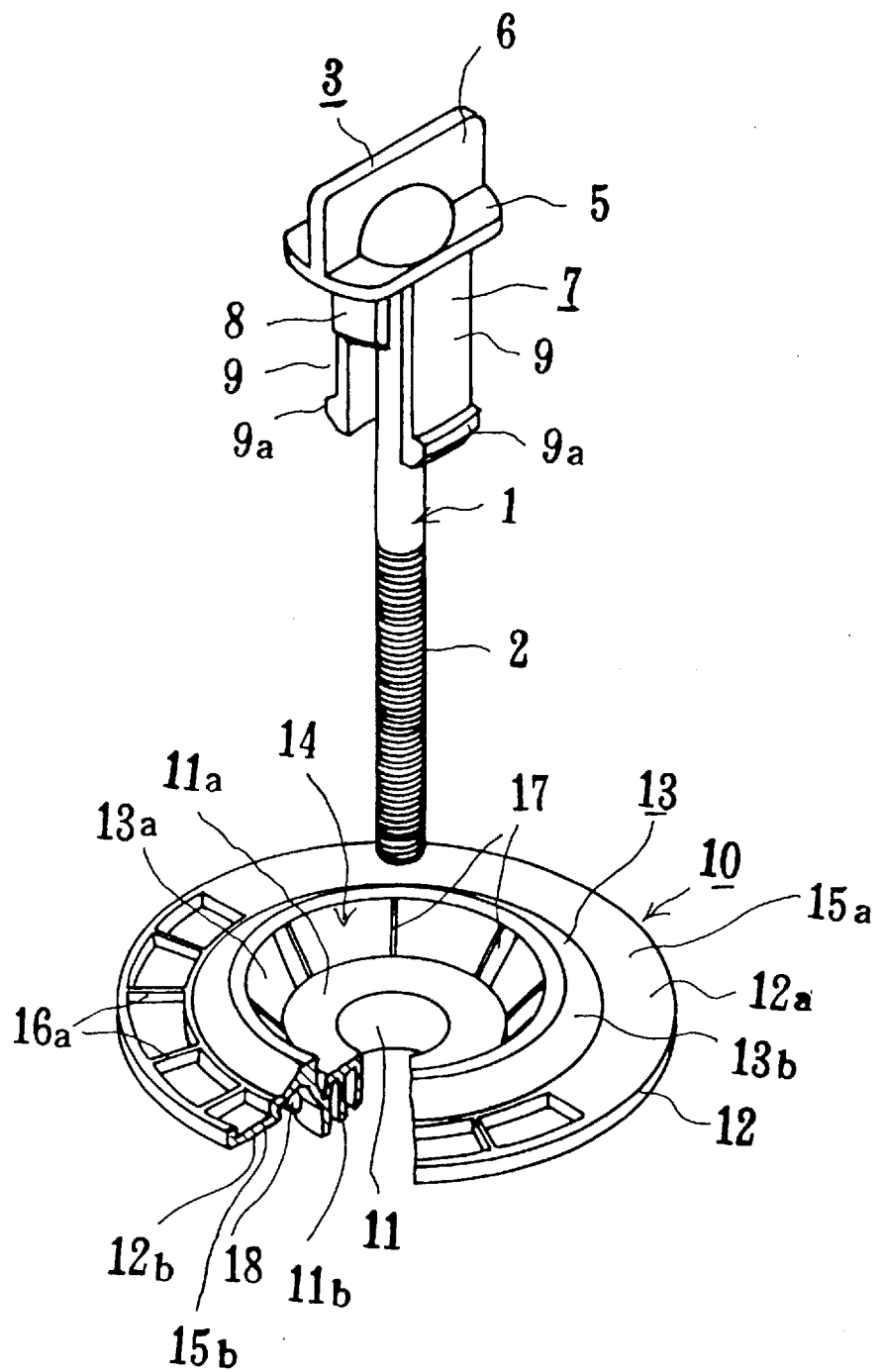
FIG. 1 is a partially cut-out perspective view showing one embodiment of the present invention by disassembling.

In the following, the present invention is explained in detail by referring to the appended drawings showing preferred embodiments of the present invention.

1 is a clamping member in which a head 3 made of plastics for screwing operation of a rod-shaped member having a screw 2 formed at the lower end thereof is provided at and integrated into the upper end of said rod-shaped member by an insert molding method. On the other hand, 10 is a substantially disc-shaped tire presser made of plastics having a shaft tube 11 having a center hole into which the screw of said clamping member can be inserted and a doughnut-shaped collar 12 provided in the outer peripheral direction of said shaft tube.

Here, as the above plastics, there may be mentioned polypropylene, polyacetal and nylon 66. The plastics to be used for the head 3 of the clamping member 1 is preferably polypropylene, particularly polypropylene containing 20% of glass fiber, for example, BJ510V (trade name, produced by Tonen Petrochemical Co., Ltd.).

According to the relevant standard in U.S.A., it is required that a tire housed in a trunk room does not. exert bad influence on a fuel tank by even when the trunk room is crushed at the time of collision of an automobile. Therefore, not only strength as a fixing device but also breaking load should be taken into consideration so that when such a situation is caused, said head is broken and the tire is jumped out from the spare tire house without causing damage to the fuel tank.

In the head 3 of the above clamping member 1, a pinch 6 for manual rotation is perpendicularly provided at the upper face of a rectangular bearing plate 5 having a longer side length which is substantially the same as the outer diameter of the shaft tube 11 of the tire presser 10, and at the lower face of said bearing plate, an engagement member 7 is perpendicularly provided for holding the clamping member 1 in the above shaft tube 11 so that when the screw of said clamping member is sufficiently inserted into the center hole of said shaft tube, said clamping member is freely rotatable relative to the longitudinal axis of said clamping member, but is not movable in the direction of said longitudinal axis. Said engagement member is constituted by a pair of elastic claws 9 and 9 (which are arranged so as to be faced to each other with the longitudinal axis of said clamping member interposed between them) having protrusions 9a and 9a formed so as to be protruded outward at the tip ends thereof, which can touch and can be engaged with the lower edge portions of the center hole of the shaft tube 11; and a pair of elastic claws 8 and 8 which are shorter than the elastic claws; 9 and 9, arranged between the elastic claws 9 and 9 and brought into contact with the inner surface of said center hole.

Figure 2:
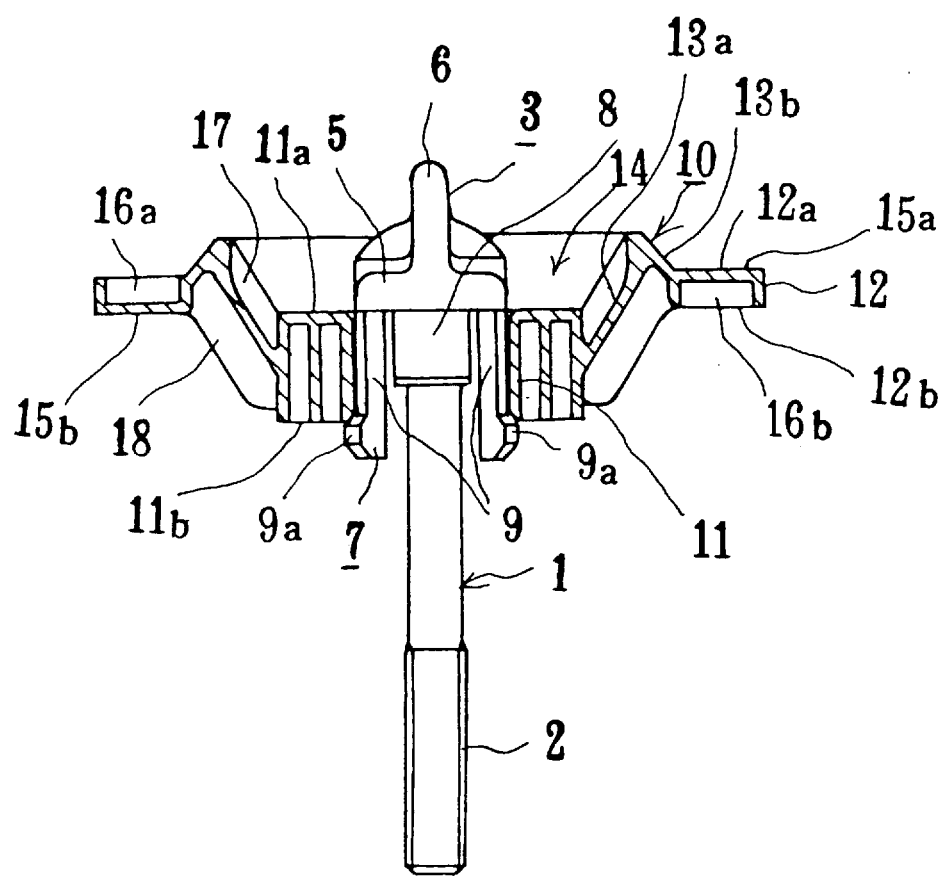
FIG. 2 is a partially cut-out sectional view showing one embodiment of the present invention in a state that a clamping member is inserted into a tire presser.
Figure 3:
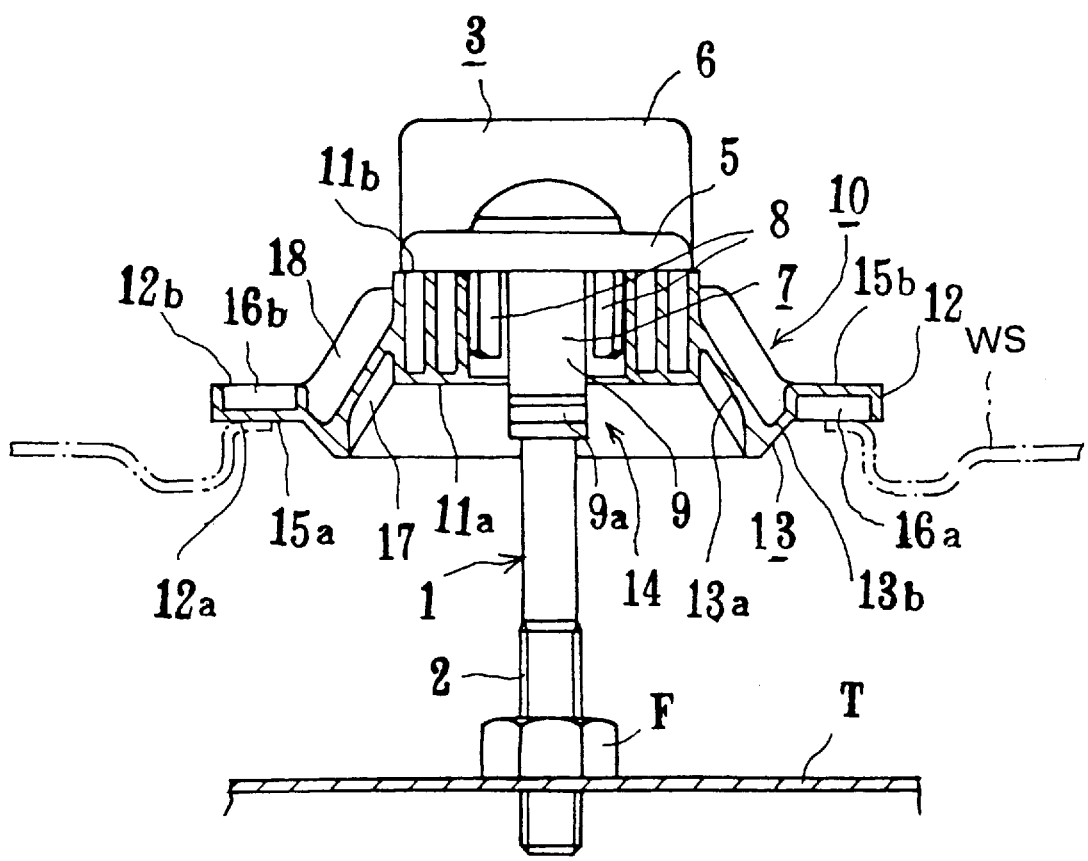
FIG. 3 is a partially cut-out side view showing one embodiment of the present invention in a state that the device of the present invention is used as a temporary tire-fixing device.
Figure 4:
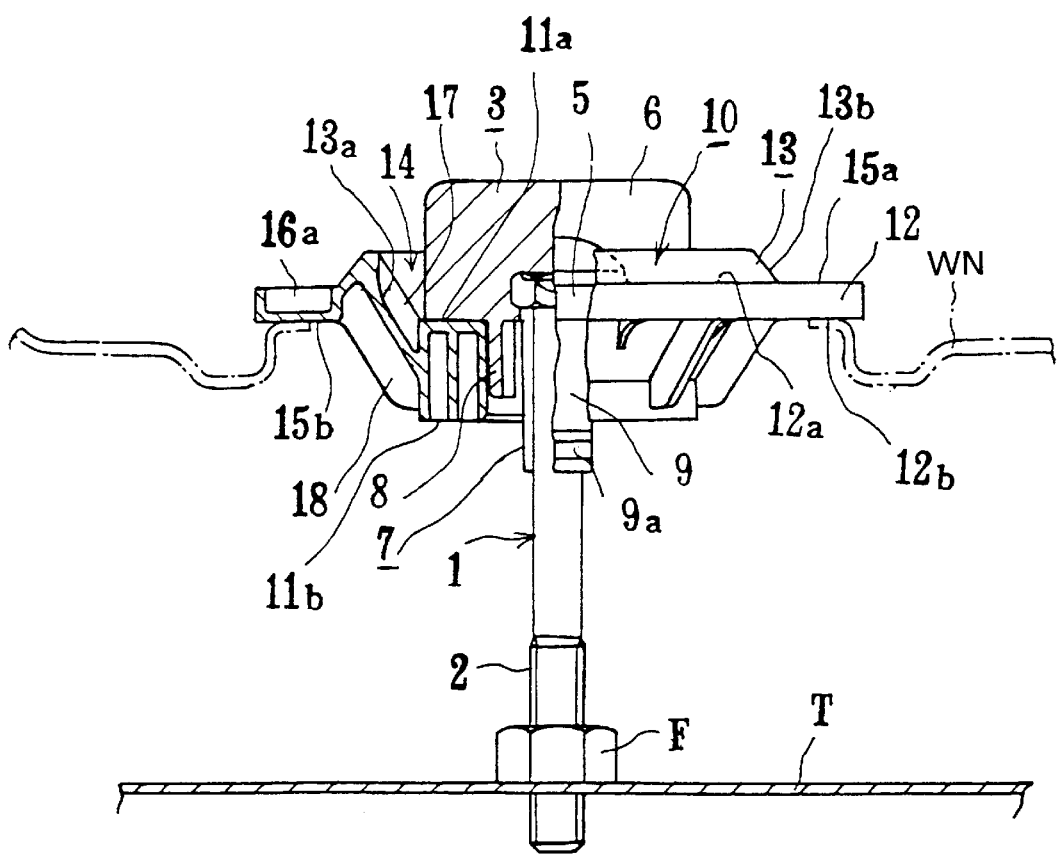
FIG. 4 is a partially cut-out side view showing one embodiment of the present invention in a state that the device of the present invention is used as a normal tire-fixing device, wherein 1 is a clamping member; 2 is a screw; 3 is a head; 5 is a bearing plate; 6 is a pinch for manual rotation; 7 is an engagement member; 8 is an elastic claw; 9 is an elastic claw; 9*a* is a protrusion; 10 is a tire presser; 11 is a shaft tube; 11*a* is a first circular bearing seat; 11*b* is a second circular bearing seat; 12 is a collar; 12*a* is a first tire-pressing face; 12*b* is a second tire-pressing face; 13 is a peripheral frame; 13*a* and 13*b* are taper walls; 14 is a concave portion; 15*a* and 15*b* are portions indicating the kind of a tire; 16*a* and 16*b* are reinforcing ribs; 17 is a reinforcing rib; 18 is a rein-forcing rib; T is a floor of a spare tire house or a bracket provided on said floor; F is a female screw; WS is a wheel of a spare tire; and WN is a wheel of a normal tire.

On the other hand, in the tire presser 10, the collar 12 having first and second tire-pressing faces 12a and 12b as upper and lower faces thereof is integrated by molding in the outer peripheral direction of the shaft tube 11 having first and second circular bearing seats 11a and 11b for touching the lower face of the bearing plate of the head 3 of the clamping member 1 as upper and lower end faces thereof so that said collar is protruded from said shaft tube in the axis direction of said clamping member (as a result, great difference in level is formed between them). Between the side portion of the shaft tube 11 and the inner edge of the collar 12, a peripheral frame 13 having an angular section is provided, which is constituted by a taper wall 13a which is widened toward the upper end (See FIG. 2 and FIG. 4. In the following, the same kind of expression showing a direction means a direction shown in said figures.) and a taper wall 13b which is widened toward the lower end and links the top of the taper wall 13a with the inner edge of the collar 12. At the inner side of said peripheral frame, a concave portion 14 with the first circular bearing seat 11a as a bottom face is formed as a result. In the figures, the first circular bearing seat 11a which becomes the bottom face of the concave portion 14 and the second tire-pressing face 12b which becomes the lower face of the collar 12 are formed so as to be positioned substantially on the same plane. However, as described below, since the difference in level between the first circular bearing seat 11a and the first tire-pressing face 12a in FIG. 3 and the difference in level between the second circular bearing seat 11b and the second tire-pressing face 12b in FIG. 4 are important, the positions of the first circular bearing seat 11a and the second tire-pressing face 12b are not limited thereto.

In the figures, the collar 12 is a channel-shaped member which is reversed at a region of 0° to 180° and a region of 180° to 360°, and its flat face portion (the outer face of the bottom of the channel) not only functions as a tire-pressing face but also functions as a face for indicating the kind of a fixed tire, i.e., distinction between "a normal tire" and "a spare tire". On the other hand, eat a portion corresponding to the groove of the channel, plural ribs 16a and 16b are arranged at predetermined angles in order to retain the strength of said collar.

Also, the shaft tube 11 is a channel-shaped member having a center hole at a position which is a center axis thereof for the purpose of reducing weight similarly as in said collar. Also in this member, ribs for retaining strergth are arranged at the portion corresponding to the groove of the channel in order to retain strength. However, the direction of the ribs is a peripheral direction. In this member, the second circular bearing seat 11b which becomes one of the bearing seats of the bearing plate 5 of the head 3 of the clamping member 1 constitutes a substantially flat face together with the end face of a portion corresponding to the side wall of the channel and the end faces of said ribs, so that the second circular bearing seat 11b is functionally the same as the first circular bearing seat 11a which is a flat face, which causes no problem.

Further, ribs for reinforcement are also provided at the inner and outer faces of the peripheral frame 13 (the ribs are shown by the reference numerals 17 and 18 and provided in the diameter direction of said member in consideration of the direction of load to be applied to said member when a tire is fixed).

When the tire-fixing device constituted as described above is not used, for example, at the time of distribution or storage, the clamping member 1 and the tire presser 10 are separated from the standpoint of space saving. On the other hand, when said device is used, the clamping member 1 is inserted from the side of the screw 3 into the center hole of the shaft tube 11 of the tire presser 10 until the lower face of the bearing plate 5 of the head 3 touches the first circular bearing seat 11a of the shaft tube 11 (in the case of the embodiment shown in FIG. 4), whereby the elastic claws 9 and 9 of the engagement member 7 perpendicularly provided at the lower face of said bearing plate of said head are protruded from the second circular bearing seat 11b of said shaft tube, and the protrusions 9a and 9a of said elastic claws are engaged with the end edge portions of the center hole of said shaft tube. Thus, the clamping member 1 is in a state that it is temporarily and rotatably held by the tire presser 10, and the clamping member 1 and the tire presser 10 are in a state that they are integrated into each other (see FIG. 2).

When the fixing device of the present invention is used for an automobile using a temporary tire as a spare tire (see FIG. 3), firstly, a temporary tire as a spare tire is placed so that a female screw F fixed to a floor T of a spare tire house or a bracket T provided on said floor becomes a center thereof. Then, the clamping member 1 is inserted from the side of the screw into the center hole of the shaft tube 11 until the lower face of the bearing plate 5 of the head 3 of said clamping member touches the second circular bearing seat 11b of said shaft tube, whereby the elastic claws 9 and 9 of the engagement member 7 are protruded from the first circular bearing seat 11a of the shaft tube 11, and the protrusions 9a and 9a of theses elastic claws 9 and 9 are engaged with the end edge portions of the center hole of said shaft tube. Thus, the clamping member 1 is in a state that it is temporarily and rotatably held by the tire presser 10. Thereafter, the screw 2 of the clamping member 1 into which said tire presser is integrated is inserted into the center space of a wheel WS of the temporary tire, said screw is applied to said female screw, and said screw is screwed into said female screw by holding the head 3 of said clamping member and rotating said clamping member. Then, the first tire-pressing face 12a which becomes the lower face of the collar 12 of the spare tire presser 10 touches the wheel WS of the temporary tire, the bearing plate 5 of said head presses the second circular bearing seat 11b which becomes the upper face of said shaft tube 11 accompanied with continuous screwing operation, and by this pressing force, the temporary tire is precisely and easily clamped and fixed in the spare tire house via the collar 12 with the first tire-pressing face 12a touching around the center space of said wheel.

On the other hand, when a punctured normal tire is replaced with a spare tire, the clamping member 1 by which a temporary tire as a spare tire is fixed in a spare tire house is reversely rotated to release engagement (the state shown in FIG. 3) of the female screw F and the screw 2 of said clamping member, and then said clamping member is pulled up to be removed in a state of temporarily holding the tire presser 10. Thereafter, the temporary tire is taken out from the spare tire house, and the punctured normal tire is placed on the same position. After engagement of the tire presser 10 and the clamping member 1 is once released (specifically, the anti-compressive forces toward the outside of the elastic claws 9 and 9 of the engagement member 7 are loosened by fingers), the tire presser 10 is reversed to return to the state shown in FIG. 2. Then, the clamping member 1 which temporarily holds said tire presser again is inserted into the center space of a wheel. When the screw 2 of said clamping member reaches the female screw F, said screw is screwed into said female screw by holding the head 3 of said clamping member and rotating said clamping member. Then, the second tire-pressing face 12b of said tire presser touches a wheel WN of the normal tire, the bearing plate 5 of said head presses the first circular bearing seat 11a which becomes the upper face of said shaft tube 11 accompanied with continuous screwing operation, and by this pressing force, the punctured normal tire is precisely and easily fixed in the spare tire house via the collar 12 with the second tire-pressing face 12b touching around the center space of said wheel (see FIG. 4).

As described above, the collar 12 having the first and second tire-pressing faces 12a and 12b as upper and lower faces thereof is provided in the outer peripheral direction of the shaft tube 11 having the first and second circular bearing seats 11a and 11b as upper and lower end faces thereof, and difference in level corresponding to the difference in tire width between the normal tire and the temporary tire, which is much larger than the difference in level between the first tire-pressing face 12a and the first circular bearing seat 11a, is formed between the second tire-pressing face 12b and the second circular bearing seat 11b. Therefore, when the tire pressed 10 is used by being reversed so that the second tire-pressing face 12b and the second circular bearing seat 11b are positioned upward, the wheel WS of the temporary tire which is a spare tire having narrow tire width is pressed and fixed by the first tire-pressing face 12a of the collar 12 (see FIG. 3). When the tire presser 10 is used so that the first tire-pressing face 12a and the first circular bearing seat 11a are positioned upward, the wheel WN of the normal tire having wide tire width is pressed and fixed by the second tire-pressing face 12b of the collar 12 (see FIG. 4). Thus, not only the temporary tire but also the normal tire can be precisely and easily housed and fixed stably in the spare tire house, which is convenient in use and advantageous in the point of cost. As can be seen from comparison between FIG. 3 and FIG. 4, the distance between the floor T of a spare tire house or the bracket T provided on said floor and the first circular bearing seat 11a (in the case of FIG. 3) or the second circular bearing seat 11b (in the case of FIG. 4) is the same although the width of a tire to be fixed varies greatly.

As can be clearly seen from the above explanation, according to the tire-fixing device of the present invention, by reversing a tire presser, not only a temporary tire but also a normal tire can be precisely and easily housed and fixed stably in a spare tire house by only one clamping member, which is convenient in use and advantageous in the point of cost. When engagement of the clamping member and the tire presser is released during storage and distribution, a space can be saved to reduce storage and distribution costs. Further, it is particularly preferred that an engagement member is constituted by a pair of elastic claws having protrusions formed at the tip ends thereof, which are engaged with the end edge portions of a center hole of a shaft tube when the clamping member is inserted from the side of a screw thereof into said center hole; and a pair of elastic claws which are shorter than the above elastic claws, arranged between the above elastic claws and brought into contact with the inner surface of said center hole when said clamping member is inserted into said center hole, because the force of said clamping member for temporarily holding said tire presser is good and such engagement can be released easily. Also, when a peripheral frame having an angular section is provided between the shaft tube and a collar of the tire presser and a concave portion with a first circular bearing seat as a bottom base is formed at the center of the tire presser, by ever if a normal tire having wide tire width is to be housed end fixed, the head of the clamping member is in the concave portion to give good appearance, i.e., falling into place, and the clamping member can be manually rotated to give good operatability. The tire-fixing device of the present invention has various advantages as described above.

Thus, the present invention provides a tire-fixing device the problems in the art of which have been solved, and therefore greatly contributes to development of the art.

We claim:

1. A spare tire-fixing device for fixing one of a normal tire and a temporary tire to a vehicle wherein the normal tire has a width which is different than that of the spare tire, the device comprising:

a rod-shaped clamping member (1) having a screw (2) at the lower end thereof configured for engagement with an attachment structure on a vehicle and a head (3) at the upper end thereof, respectively the head having a bearing plate (5) with a lower face; and a substantially disc-shaped tire presser (10) having a shaft tube (11) having first and second circular bearing seats (11a, 11b) as both end faces thereof and a center hole into which the screw of said clamping member can be inserted, at the center thereof, and a collar (12) which is a doughnut-shaped member linked with said shaft tube via a peripheral frame (13) in the outer peripheral direction of said shaft tube and has first and second tire-pressing faces (12a, 12b) as both end faces thereof, respectively, wherein at the lower face of the bearing plate (5) of the head of said clamping member, an engagement member (7) is perpendicularly provided, which holds said clamping member to said tire presser when said screw of said clamping member is inserted into said center hole of said shaft tube of said tire presser so that when the screw of said clamping member is inserted into the center hole of the shaft tube of said tire presser, said clamping member is allowed to rotate relative to the longitudinal axis of said clamping member, but is controlled not to move in the direction of said longitudinal axis with respect to said tire presser;

wherein said tire presser is placed on said clamping member and held thereto by said engagement member such that said plate is adjacent said first bearing seat and said second tire-pressing surface is oriented to engage the normal tire and is alternatively placed on said clamping member and held thereto by said engagement member such that said plate is adjacent said second bearing seat and said first tire-pressing surface is oriented to engage the temporary, tire whereby said tire presser is configured such that the distance between said first bearing seat and said second tire pressing surface is different than the distance between said second bearing seat and said first tire pressing surface to provide a means to accommodate the difference in width corresponding to the difference between the width of the normal tire and the temporary tire.

2. The device according to claim 1, wherein the engagement member (7) comprises a pair of elastic claws (9, 9) which are faced to each other with the longitudinal axis of the clamping member (1) interposed between them and have protrusions (9a, 9a) formed at the tip ends thereof, which touch and are engaged with the first circular bearing seat (11a) or the second circular bearing seat (11b) of the shaft tube (11) of the tire presser (10) when the screw (2) of said clamping member is inserted into the center hole of said shaft tube; and a pair of elastic claws (8, 8) which are shorter than the elastic claws (9, 9), arranged between the elastic claws (9, 9) and brought into contact with the inner surface of the center hole of said shaft tube when said screw is inserted into the center hole of said shaft tube.

3. The device according to claim 1, wherein the peripheral frame (13) linking the shaft tube (11) with the collar (12) is a member having an angular section, and has a concave portion (14) with the first circular bearing seat (11a) as a bottom face, formed at the inner side thereof.

4. The device according to claim 2, wherein the peripheral frame (13) linking the shaft tube (11) with the collar (12) is a member having an angular section, and has a concave portion (14) with the first circular bearing seat (11a) as a bottom face, formed at the inner side thereof.

* * * * *